United States Patent Office 3,756,820
Patented Sept. 4, 1973

3,756,820
POLYMER IMAGE FORMATION
Yoshihide Hayakawa and Masato Satomura, Asaka, Japan, assignors to Fuji Photo Film Co., Ltd., Kanagawa, Japan
No Drawing. Continuation of abandoned application Ser. No. 873,125, Oct. 31, 1969. This application Feb. 14, 1972, Ser. No. 226,208
Claims priority, application Japan, Oct. 13, 1968, 43/79,516
Int. Cl. G03c 1/68, 5/26
U.S. Cl. 96—48 R    37 Claims

ABSTRACT OF THE DISCLOSURE

A method of forming an image which comprises reacting a silver halide photographic emulsion having a latent image with at least one active methylene compound represented by the following General Formulas (a), (b) or (c), tautomeric isomers thereof and metal complex salts thereof, in the presence of at least one addition-polymerizable vinylidene monomers or vinyl monomers, to polymerize said monomer selectively at latent image areas General Formula (a)

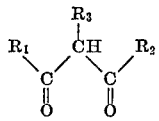

in which $R_1$ and $R_2$ are alkyl, substituted alkyl or phenyl groups, $R_3$ is a hydrogen atom, alkyl or substituted alkyl group, and $R_1$ may form a ring with $R_2$ or $R_3$, General Formula (b)

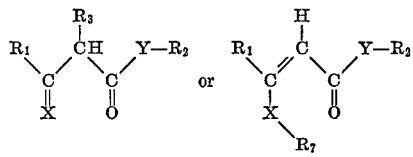

in which $R_1$ is hydrogen atom or alkyl group, $R_2$ is an alkyl group, substituted aromatic ring or sodium, $R_3$ is hydrogen atom, alkyl substituted alkyl, cyano group or chlorine atom, $R_2$ and $R_3$ may form a ring, $R_7$ is an aromatic ring when X is —NH— and an acyl or alkyl group when X is —O—, X is O, NH or

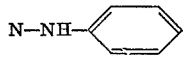

and Y is O or NH, and

General Formula (c)

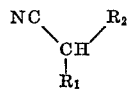

in which $R_1$ is hydrogen atom, acyl or phenyl group and $R_2$ is an ethoxycarbonyl or cyano group.

---

This is a continuation of application Ser. No. 873,125, filed Oct. 31, 1969, and now abandoned.

BACKGROUND OF THE INVENTION

Field of the invention

This invention relates to a method of forming a polymer image, and more particularly, to a method wherein a high molecular weight compound is selectively formed on an area corresponding to a photographic latent image by the reaction of a silver halide photographic emulsion and a reducing agent in the presence of an addition polymerizable compound.

Description of the prior art

Various attempts have been proposed to polymerize a vinyl compound by the action of light to thereby form a high molecular weight compound, thereby forming an image. It has also been proposed to directly cause photopolymerization by the use of a silver halide as a catalyst (cf. British 866,631, S. LeVinos et al.; "Photographic Science and Engineering," vol. 6, pp. 222–226 (1962)). In this reaction, the photo-decomposition product of a silver halide can be a catalyst for the direct polymerization and, consequently, the sensitivity obtained herein is not as high as in the case wherein silver halide particles are reduced by ordinary development.

It has further been proposed to form, imagewise, highly polymerized compounds by polymerizing vinyl compounds using, as a catalyst, a silver image or unreacted silver halide after the development of an exposed silver halide emulsion with an ordinary developing solution (see Belgian Pat. 642,477). This reaction has a disadvantage in that the operations of developing and polymerizing must be carried out separately. Moreover, it is theoretically of great interest to develop an exposed silver halide with a reducing compound in the presence of a vinyl compound and to effect polymerization of the vinyl compound by an oxidized product or an intermediate product formed during the redox step, since both amplifying actions by developing and by chain polymerization can be effected. It has already been proposed to carry out this reaction using as the reducing agent a benzenoid compound, such as one having two or more hydroxyl groups, amino groups or alkyl- or aryl-substituted amino groups in the ortho-para-position on a benzene ring to each other (U.S. Pat. 3,019,194, G. Oster; "Nature," vol. 180, p. 1275 (1957)).

SUMMARY OF THE INVENTION

It is therefore the object of this invention to convert an image from electromagnetic waves or particle rays into an image of a high molecular weight compound by a simple procedure.

It is another object of this invention to obtain a polymer image having desirable properties by applying this method to recording or printing.

A method of forming an image which comprises reacting a silver halide photographic emulsion having a latent image with at least one active methylene compound represented by the following General Formula 2, (b) or (c), tautomeric isomers thereof and metal complex salts thereof, in the presence of at least one addition-polymerizable vinylidene monomers or vinyl monomers, to polymerize said monomer selectively at latent image areas General Formula (a)

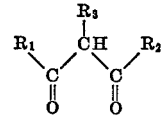

in which $R_1$ and $R_2$ are alkyl, substituted alkyl or phenyl groups, $R_3$ is a hydrogen atom, alkyl or substituted alkyl group, and $R_1$ may form a ring with $R_2$ or $R_3$, General Formula (b)

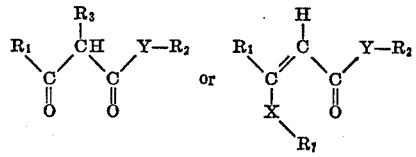

in which $R_1$ is hydrogen atom or alkyl group, $R_2$ is an alkyl group, substituted aromatic ring or sodium, $R_3$ is hydrogen atom, alkyl substituted alkyl, cyano group or chlorine atom, $R_2$ and $R_3$ may form a ring, $R_7$ is an aromatic ring when X is —NH— and an acyl or alkyl group when X is —O—, X is O, NH or

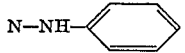

and Y is O or NH, and

General Formula (c)

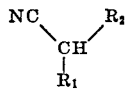

in which $R_1$ is hydrogen atom, acyl or phenyl group and $R_2$ is an ethoxycarbonyl or cyano group.

DETAILED DESCRIPTION OF THE PREFERRED EMBODIMENTS

We, the inventors, have found that when a silver halide is reduced with an active methylene compound in the presence of a vinyl compound as mentioned hereinafter, the polymerization of said vinyl compound can be initiated. When using a silver halide photographic emulsion as the silver halide, the reaction occurs more rapidly at a place where silver halide fine crystals possess a developing center, so that the polymerization can occur selectively only at an area where silver halide particles possessing a developing center are present. This can be done by the proper selection of reaction conditions and reaction time.

The present invention can be accomplished by utilizing the above-mentioned fact that is; that by reacting a silver halide emulsion layer having a photographic latent image with at least one active methylene compound in the presence of a polymerizable vinyl compound, one can cause polymerization of said vinyl compound selectively at areas where the latent image is present.

The photographic latent image is basically an imagewise change formed in a silver halide photographic emulsion by the action of electromagnetic waves or particle rays. It is ordinarily invisible, but can be converted into a visible image by development.

In the photographic emulsion layer utilized for forming a negative image, the latent image is formed due to the formation of development centers in silver halide grains irradiated by electromagnetic waves or particle rays. In a photographic emulsion layer utilized for forming a direct positive image, the latent image is formed by providing development centers in all of the silver halide grains present in the layer, and then removing the development centers by irradiation with electromagnetic waves or particle rays (James and Huggins, "Fundamentals of Photographic Theory" 2d ed., published by Morgam & Morgan 1969, chapters 3 and 4).

In the process of the present invention, the aforesaid photographic silver halide emulsion utilized for forming negative images as well as the photographic silver halide emulsion utilized for forming positive images can be employed.

In the present invention, as a silver halide photographic emulsion that gives a negative image, an emulsion which is suitable for ordinary "developing out" processes may be used. Thus, silver chloride, silver bromide, silver chlorobromide, silver iodobromide, and silver chloro-iodobromide photographic emulsions can be used. Chemical sensitization and optical sensitization which are applicable to ordinary photographic emulsions can be applied to the silver halide emulsions for use in the present invention. Thus, sulfur sensitization and noble metal sensitization are applicable means of chemical sensitization (see, for example, P. Glafkides, "Chimie Photographique," 2d ed., photocinema Paul Montel, Paris 1957, pp. 247–301). As for optical sensitization, optical sensitizers used for ordinary photographic emulsions such as cyanine dyes and mercocyanine dyes can be used, see, for example, Kikuchi et al., "Kagaku Shashin Benran (Handbook of Scientific Photography)," vol. II, pp. 15–24, Maruzen Co., 1959. The emulsion used in the present invention may also contain stabilizers as are employed in conventional photographic techniques.

The direct positive silver halide photographic emulsion used in this invention can be prepared by utilizing solarization, the Herschel effect, the Clayden effect and the Sabatier effect. These effects are illustrated in, for example, C. E. K. Mees, "The Theory of the Photographic Process" 2d ed. (published by Macmillan Co., 1954), chapters 6 and 7. For the preparation of the direct positive silver halide emulsion utilizing solarization, it is preferred that a silver halide photographic emulsion liable to cause solarization be prepared and previously subjected to uniform exposure or reaction with chemicals to render it sufficiently developable witnout image exposure. A method of preparing such an emulsion is disclosed in, for instance, British 443,245 and British 462,730.

The Herschel effect is caused by applying light of long wavelength to silver halide that has been over-all subjected to exposure or reaction with chemicals so as to be developable. In this case, a silver halide emulsion containing primarily silver chloride is favorably used, and a sensitizer such as pinakryptol yellow or phenosafranine may be added to promote this effect. A method of making direct positive emulsions utilizing the Herschel effect is disclosed in, for instance, British 667,206, U.S. 2,857,273, etc.

In order to obtain a direct positive utilizing the Clayden effect, it is necessary to expose the total surface at a relatively low intensity of illumination after image exposure at a high intensity of illumination. This must occur in a short time, and no developable property is brought to an area where image exposure at a high intensity of illumination is not given before over-all exposure.

The Sabatier effect is due to the developable possibility resulting on an imagewise exposure-free area by imagewise exposing a silver halide emulsion and then subjecting it to over-all exposure in the immersed state in a developer, or else subjecting it to reaction with chemicals. Both the effects can readily and practically be obtained in silver halide emulsions that have a tendency to yield centers of development in their inner portion, rather than in the surface portion of the silver halide grains.

Methods of making such an emulsion (tending to form internal centers of development) are disclosed in, for example, U.S. Pat. 2,592,250, U.S. Pat. 2,497,876, British Pat. 1,011,062 and German Pat. 1,207,791, etc.

The above described photographic emulsion consists of a system wherein silver halide particles are dispersed in a solution of a high molecular weight compound. As the high molecular weight compound, gelatin is generally used, but synthetic high molecular weight compounds such as polyvinyl alcohol, polyvinylpyrrolidone and polyacrylamide or natural high molecular weight derivatives such as carboxymethyl cellulose, cellulose oxyethyl ether and dextran may be used alone or together with gelatin (cf. F. Evva, "Zeitschrift fur Wissenschaftliche Photgtaphie, Photophysik und Photochemie" vol. 52, pp. 1–24 (1957)).

The term active methylene compound and derivative thereof used in this invention means a compound represented by the following General Formula 1, tautomeric compounds and metal complex salts thereof,

in which A and B are electron attractive groups and R is hydrogen atom, alkyl group, substituted alkyl group, acyl group or phenyl group.

In the above mentioned compound, compounds represented by the following General Formulas (a), (b) and (c), are preferable.

General Formula (a)

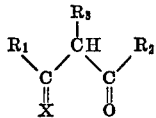

in which $R_1$ and $R_2$ are alkyl groups, substituted alkyl groups or phenyl groups, $R_3$ is a hydrogen atom, an alkyl or substituted alkyl group and $R_1$ may form a ring with $R_2$ or $R_3$.

General Formula (b)

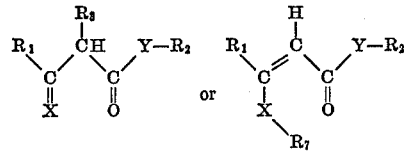

in which $R_1$ is hydrogen atom or alkyl group, $R_2$ is an alkyl group, substituted aromatic ring or sodium, $R_3$ is hydrogen atom, alkyl, substituted alkyl, cyano group or chlorine atom, $R_2$ and $R_3$ forming a ring in some cases, $R_7$ is an aromatic ring when X is —NH— and an acyl or alkyl group when X is —O—, X is O, NH or

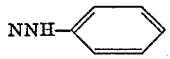

and Y is O or NH, and

General Formula (c)

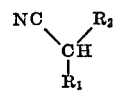

in which $R_1$ is hydrogen atom, acyl or phenyl group and $R_2$ is an ethoxycarbonyl or cyano group.

Illustrative of the compounds of the invention represented by the foregoing General Formulas (a), (b) and (c) are the following:

(1)

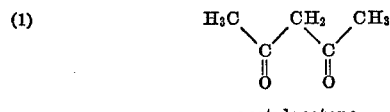

acetylacetone (2)

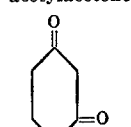

1,3-cyclohexanedione (3)

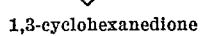

6-acetyl-3-methyl-2-cyclohexene-1-one (4)

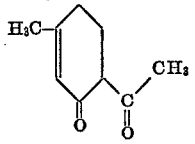

3-acetyl-2,6-heptanedione (5)

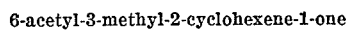

ethyl nickel acetoacetate (6)

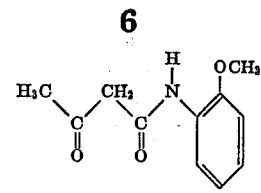

o-methyl-acetoacetanilide (7)

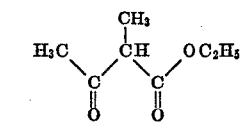

ethyl α-methylacetoacetate (8)

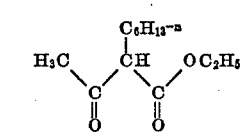

ethyl α-n-hexyl-acetoacetate (9)

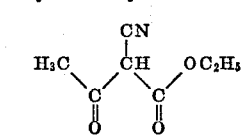

ethyl α-cyanoacetoacetate (10)

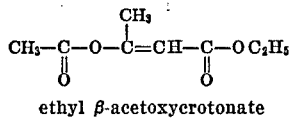

ethyl β-acetoxycrotonate (11)

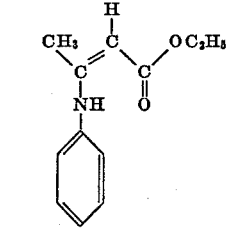

ethyl 3-anilinocrotonate (12)

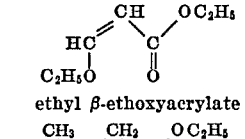

ethyl β-ethoxyacrylate (13)

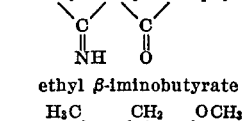

ethyl β-iminobutyrate (14)

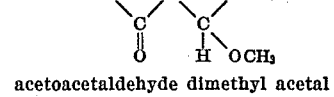

acetoacetaldehyde dimethyl acetal (15)

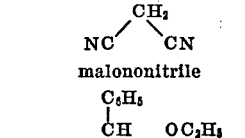

malononitrile (16)

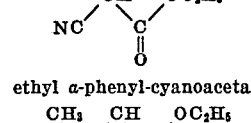

ethyl α-phenyl-cyanoacetate (17)

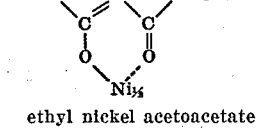

ethyl nickel acetoacetate

(18) ethyl α-n-butylacetoacetate

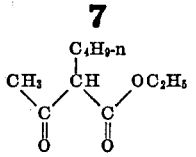

(19) acetoacetanilide

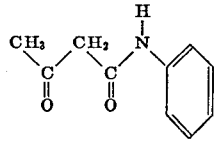

(20) benzoyl acetone

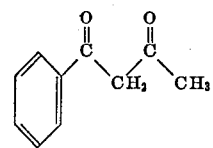

(21) methyl acetoacetate

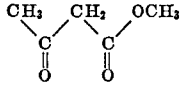

(22) ethyl α-n-amyl-acetoacetate

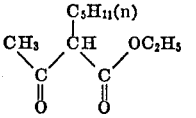

(23) sodium acetoacetate

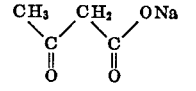

(24) 2-acetylbutyrolactone

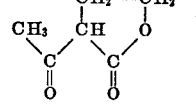

(25) ethyl α-chloroacetoacetate

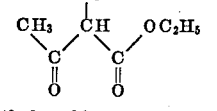

(26) phenylhydrazone dehydroacetate

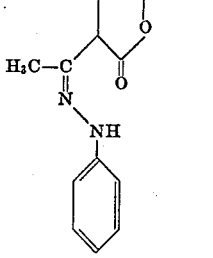

The synthesis methods for Compounds 1–25 are well known and they are commercially available.

Compound 26 is obtained by reacting dehydroacetic acid with an equivalent amount of phenylhydrazine in tetrahydrofuran under cooling at −15° C., the temperature being gradually returned to 0° C., and the resulting precipitate being recrystallized in tetrahydrofuran to give a product having the following properties:

Melting point: 199–202° C.
Ultraviolet absorption spectrum
  $\lambda\max._1$, 99%EtOH: 245 m$\mu$, log $\epsilon$: 4.01
  $\lambda\max._2$, 99% EoOH: 352 m$\mu$, log $\epsilon$: 3.60
Infrared absorption spectrum
  $\gamma$coc.: 1250 cm.$^{-1}$, $\gamma$NH: 3405 cm.$^{-1}$, 3360 cm.$^{-1}$ Moreover, these compounds can be used as a metal complex salt. In this case, the compound may be isolated as a metal complex salt, or a complex salt may be formed in the solution by adding a metal salt thereto. The stability constants of these metal complex salts, in particular, of the complex salts of acetylacetone derivatives are well known (cf. Martell and Calvin, "Chemistry of the Metal Chelate Compounds" published by Prentice-Hall Inc. (1962), in particular, table in p. 549).

The use of a silver halide in the form of a photographic emulsion in the invention serves to enlarge the differences of reactivities between an area irradiated with electromagnetic waves or particle rays and an area not irradiated, that is, it enlarges the selectivity of reaction.

It has been recently reported that an active methylene compound can be used for the initiation of polymerization (cf. H. Bredereck, B. Foehlisch and R. Franz, "Makromoleculare Chemie" 92 (1966), pp. 70–90).

According to their report, the active methylene compound may initiate polymerization of a vinyl compound in the presence of Cu$^{++}$, Cl$^-$ and oxygen or a peroxide. In their system, however, oxygen, Cu$^{++}$ or peroxide acts as an oxidizer and, consequently, the polymerization has no selectivity to irradiation.

It has also been reported that a complex compound of β-diketone such as acetylacetone may be used as a polymerization initiator (cf. C. H. Bamford & D. J. Lind, "Chemistry and Industry" 1627 (1965) and the references cited therein). In this report, they estimate that polymerization is initiated by the following radical:

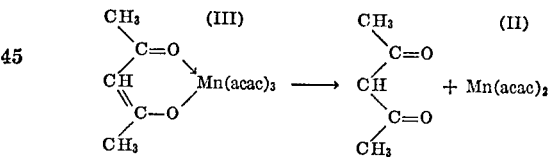

In the system of this initiator, reaction is also due to the radical generated by oxidation with a metal salt, and is therefore independent of irradiation.

In the present invention, on the other hand, a silver halide acts as an oxidizer, so that the rapidity of the initiation of polymerization varies with the presence or absence of centers of development on the silver halide particles; that is, with the presence or absence of irradiation with electromagnetic waves or particle rays. This is a very important feature. The reaction mechanism is not yet clear in exactly how a silver halide is reduced with the compound of the foregoing General Formulas (a), (b) or (c), resulting in a polymerization of a vinyl compound. However, it is believed that the polymerization progresses by a radical mechanism from the fact that monomers susceptible to radical polymerization can generally be utilized, and that reaction proceeds in an aqueous solution and is retarded by a radical polymerization inhibitor. It is not clear whether the radical is generated directly by the reaction of the compound of the foregoing General Formulas (a), (b) or (c) with a silver halide, or by interaction with water, oxygen, etc. in the system, but it is clear that the polymerization of a vinyl compound occurs simultaneously wtih the reduction of the silver halide, since there is found no polymerization in the case of adding the vinyl compound to the reaction system after the irradiated silver halide is reduced with the compound of the foregoing General Formulas (a), (b) or (c). Therefore, an intermediate product of a silver halide and compound of the General Formulas (a), (b) or (c) may possibly contribute to the polymerization reaction.

For a report on the intermediate product formed by the oxidation of β-diketone or β-ketoacid ester with a monoelectron oxidizer, cerium sulfate, one should refer to G. A. Russel & Lockengard, "Journal of the American Chemical Society" 89 5059 (1967).

In their report, some discussion is made on the intermediate product, at the radical state, the following reaction scheme is considered for the oxidation process of 1,3-cyclopentanedione:

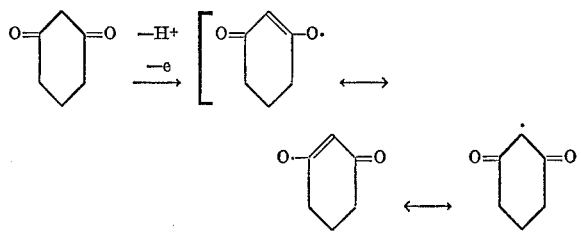

The initiation of polymerization in the present invention is likely due to the radicals of active methylene compounds formed during oxidation of a silver halide. Upon stopping the reaction in a suitable period of time, there is selectively formed a high molecular weight compound at the irradiated areas only, and, when a longer reaction time was used, the formation thereof begins at the non-irradiated areas. However, the utility of the invention is not spoiled by this phenomenon, which corresponds to the so-called fog phenomenon in ordinary photography wherein exposed and non-exposed areas are all blackened by increased developing time.

According to the so-called tanning developing method, crosslinking gelatin with an oxidation product of a developing agent, which method is well known as a method for forming an image with a high molecular weight material by utilizing the photosensitivity of a silver halide, the formed image is limited to a substance of crosslinked gelatin. On the contrary, images of high molecular weight material obtained according to the present invention show various excellent properties depending on the vinyl compounds used, some of the properties, for instance dyeing property and chemical resistance, being better than those of crosslinked gelatin.

It is found that, according to the method of this invention, the polymerization of a vinyl compound is accelerated by the presence of sulfite ion in the system.

The sulfite ion may be supplied to the system either by adding a compound possessing sulfite ions such as alkali metal and ammonium sulfites and bisulfites, or by adding a material capable of forming sulfite ions through hydrolysis in aqueous solution, such as alkali metal and ammonium pyrosulfites, and adducts of bisulfite and aldehydes such as formaldehyde or glyoxal. Although the appropriate amount of sulfite ion to be added to the system depends on the kind and amount of reducing agent and vinyl monomer employed and the pH of the system, it is preferably 0.05 mol or more per 1 l. of the system, particularly 0.2 mol or more.

The addition of a sulfite to a photographic developer is widely known. In this case, it is believed that the sulfite plays the role of inhibiting the autooxidation of a developing agent such as hydroquinone or p-aminophenol through reaction with an oxidized product thereof, as well as inhibiting any uneven developing reaction (cf. C. E. K. Mees, "The Theory of the Photographic Process" 2d ed., published by MacMillan Co. (1954), p. 652). It is now to be noted that the polymerization accelerating effect of a sulfite in the present invention is completely different from the action of removing an oxidized product in the ordinary developer as mentioned above, since, in this invention an oxidized intermediate product of an active methylene compound with a silver halide initiates the polymerization. If the sulfite herein served only to remove the oxidized product, polymerization would be suppressed rather than enhanced.

Although the mechanism of the sulfite action in this invention is not clear, it is reasonable to think that the hindrance of polymerization by oxygen is inhibited.

Suitable for use as the vinyl compound of the invention are addition-polymerizable compounds which are liquid or solid at room temperature or mixtures thereof, for example, acrylamide, acrylonitrile, N-hydroxy-methylacrylamide, methacrylic acid, acrylic acid, calcium acrylate, sodium acrylate, methyl methacrylate, methyl acrylate, ethyl acrylate, vinylpyrrolidone, 2-vinylpyridine, 4-vinylpyridine, 2-methyl-N-vinylimidazole, potassium vinylbenzenesulfonate and vinylcarbazole. In the invention, a compound having two or more vinyl groups is particularly suitable, and this may be used alone, or together with the foregoing compound having one vnyl group. Illustrative of such compounds having two or more vinyl groups are N,N-methylenebisacrylamide, ethylene glycol dimethacrylate, diethylene glycol dimethacrylate, triethylene glycol dimethacrylate, polyethylene glycol dimethacrylate, divinyl ethers and divinyl benzene.

In the present invention, a water-soluble vinyl compound is preferably used, but a water-insoluble vinyl compound may be polymerized in the form of an emulsion. The emulsification may be carried out by a suitable stirring device in the presence of a surfactant and/or high molecular weight compound in the conventional manner.

Any electromagnetic wave or corpuscular ray to which the ordinary photographic emulsion is sensitive can be used in this inveniton. That is to say, visible rays, ultraviolet rays, infrared rays of 1.3 microns or less, X-rays, γ-rays and corpuscular rays such as electron rays and α-rays are available.

For the practice of the invention, it is necessary to conduct two steps of irradiation with electromagnetic waves or particle rays in the reduction and polymerization reaction. In particular, for the recording of an image, it is desired that there be very little positional movement of silver halide particles in the reaction system between radiation with electromagnetic waves or particle rays and the polymerization reaction. For this purpose, the system is preferably held in the state of a highly viscous liquid or gel. A photographic emulsion, to which natural or synthetic high molecular weight compounds have previously been added itself has some viscosity or else can be gelled to some extent, but when this is insufficient, larger amounts of a high molecular weight compound must further be added.

When subjected to irradiation with electromagnetic waves or particle rays, a silver halide may be either in an aqueous solution or in the gel state. That is to say, a highly viscous or gelled photographic emulsion may be used on a suitable support in the undried state, or may be coated onto a suitable support in the dried state. Since the reduction and polymerization occur simultaneously, the reduction must be carried out in the presence of a vinyl compound. In the method of this invention, both the foregoing active methylene compound acting as a reducing agent for the silver halide and the vinyl compound to be polymerized may previously be contained in the emulsion, or only one may be contained therein while the other may be added to the system after irradiation. In some cases, both may even be added after irradiation.

Since the presence of water is necessary for the practice of the reduction and polymerization reaction, the reaction must be carried out in an aqueous solution or in the wet gelled state.

This reaction proceeds well in an alkaline state, i.e. at a pH greater than about 6, preferably greater than about 7, the most suitable pH depending upon the variety and concentration of the silver halide, reducing agent and high molecular weight compound as the medium, and the reaction temperature.

In the case where a photographic emulsion is coated onto a support and used as a photographic light-sensitive material, this light-sensitive material is irradiated with electromagnetic waves or particle rays and immersed in an aqueous alkali solution to cause the reaction to proceed. The reducing agent or vinyl compound can be contained in this solution.

Stopping the reaction can readily be accomplished by converting the system to an acid range, for example, a pH of less than 5, removing the reactant by washing, cooling, dissolving any silver halide in a fixing solution for photography, or adding a polymerization inhibitor to the system.

Where a high molecular weight material as a medium for the silver halide and a vinyl compound monomer are previously formed in a coating, it is desirable to add a small amount of inhibitor for thermal polymerization in order to inhibit spontaneous overall thermal polymerization of the vinyl compound prior to processing. As the inhibitor for thermal polymerization for ordinary radical polymerization, for example, there are p-methoxyphenol, hydroquinone, alkylhydroquinone and 2,6-di-t-butyl-p-cresol.

Where a vinyl compound has previously been incorporated into the system, the weight of the vinyl compound used is $\frac{1}{30}$–30 times, preferably $\frac{1}{4}$–4 times as much as that of a high molecular weight compound previously added. The silver halide used is $\frac{1}{20}$–2 times, preferably $\frac{1}{10}$–$\frac{1}{2}$ times as much as the high molecular weight compound previously added. All figures are by weight. In the case of previously adding a reducing agent to the system, also, the amount of a reducing agent is preferably about $\frac{1}{10}$–20 mols per 1 mol of a silver halide used. Moreover, in the case of adding an inhibitor for thermal polymerization, its amount is preferably $\frac{1}{100,000}$–$\frac{2}{100}$ times by weight, as much as that of the vinyl compound. In the case of adding a vinyl compound to a processing solution, it is ordinarily desired that the concentration be as high as possible and that the amount added to the solution be limited only by the solubility of the vinyl compound in the processing solution. In the case of adding an active methylene compound used as a reducing agent to a processing solution, the concentration is preferably $\frac{1}{20}$–5 mols, particularly $\frac{1}{10}$–1 mol.

Further to the above, there may be a suitable interval of time between the irradiation with electromagnetic waves or corpuscular rays and the polymerization, as in ordinary silver halide photography. In some cases, the effect of radiation decreases, depending on the properties of a photographic emulsion used, and the conditions and time the photographic material is allowed to stand. In such cases, desirable effects can be obtained by increasing the amount of exposure.

Where the method of this invention is adapted for the recording of an image, it is possible to optionally utilize the differences between a vinyl compound and its polymer in their physical and chemical properties, such as solubility, light scattering, adhesiveness, dyeing affinity, etc. In utilizing the difference of solubility, for example, an image can be formed by dissolving off a non-polymerized area after radiation and reaction, thus leaving an image of high molecular weight material on the irradiated area only.

In this case, it is preferred that a high molecular weight compound which is added initially me dissolved off together with the non-reacted monomer. To this end, preferably, the high molecular weight compound contained initially in the system is such a high molecular weight compound that the structure is two-dimensional or linear, and substantially free from cross-linking, or else the main chain or cross-linking can readily be broken, while the high molecular weight compound formed by the reaction is a so-called three-dimensional cross-linked polymer. For this purpose, it is desired, as mentioned before, to use a compound having a plurality of vinyl groups alone, or together with a compound having one vinyl group. However, even if the high molecular weight material formed is a two-dimensional high molecular weight material, there often occurs a difference in solubility between an area where the high molecular weight material and a high molecular weight compound added previously are brought into interaction with each other to form a high molecular weight material, and another area where such a high molecular weight material is not formed, for example, in a case of polyacrylic acid and gelatin. Thus, it is not always necessary to use a monomer having a plurality of vinyl groups.

An image consisting of the high molecular weight material made by the method of this invention can be utilized for various printing and recording methods.

Furthermore, the present invention is available for forming a dye image. In this method, a polymer image is selectively dyed with a dye having an opposite charge by using a monomer having a group which is capable of having imparted thereto a charge by ionization or by adding thereto a hydrogen cation, such as a vinyl monomer and then forming a polymer capable of having a charge imparted thereto by ionization or by the addition of hydrogen cation. The dye image thus obtained can be transferred to another support by various state of the art methods.

Addition-polymerizable vinyl compounds capable of having a charge imparted thereto by ionization or by the addition of a hydrogen cation, which can be utilized in the above-mentioned case, are the following. As those providing a high molecular weight compound which is to be formed with negative charge, there are: vinyl compounds having a carboxyl group such as acrylic acid, methacrylic acid, itaconic acid and maleic acid; vinyl compounds having a metal or ammonium carboxylate group such as ammonium acrylate, sodium acrylate, potassium acrylate, calcium acrylate, magnesium acrylate, zinc acrylate, cadmium acrylate, sodium methacrylate, calcium methacrylate, magnesium methacrylate, zinc methacrylate, cadmium methacrylate, sodium itaconate and sodium maleate; vinyl compounds having sulfonate group such as vinylsulfonic acid and p-vinylbenzenesulfonic acid, and vinyl compounds having a metal or ammonium sulfonate group such as ammonium vinylsulfonate, sodium vinylsulfonate, potassium vinylsulfonate and potassium p-vinyl-benzenesulfonate. As materials providing a high molecular weight compound formed with a positive charge, there are vinyl compounds having a basic nitrogen atom such as 2-vinylpyridine, 4-vinylpyridine, 5-vinyl-2-methylpyridine, N,N-dimethylaminoethyl acrylate, N,N-dimethylaminoethyl methacrylate, N,N-diethylaminoethyl acrylate and N,N-diethylaminoethyl methacrylate and vinyl compounds having a quaternary nitrogen atom made by reacting these bases with methyl chloride, ethyl bromide, dimethyl sulfate, diethyl sulfate and methyl p-toluenesulfonate. These compounds are commercially sold and may be synthesized by any well-known method. These compounds may be used alone or in combination. Moreover, they may be used together with a charge-free water-soluble, addition-polymerizable vinyl compound such as acrylamide, N-hydroxymethylacrylamide, methacrylamide, methyl methacrylate, vinylpyrrolidone, N,N-methylene-bisacrylamide, triethylene glycol dimethacrylate and triethylene glycol dimethacrylate. In the case of using a vinyl compound having no charge, the reactivity and the porportion of the vinyl compound must be so selected that a high molecular weight compound having substantially no electrolytically dissociating groups is formed as a result of the polymerization of only the vinyl compound having no charge.

As a dye capable of ionizing and carrying a charge, in this case there can be used oridinary acid dyes and basic dyes. When using a vinyl compound such as providing a high molecular weight compound having a negative charge, a basic dye is used. An acid dye whose dye molecule is negatively charged dyes a high molecular weight compound having positive charge well, while a basic dye whose dye molecule is positively charged dyes a high molecular weight compound having negative charge well. Therefore, a dye image will be obtained which corresponds to a high molecular weight compound which has been imagewise formed.

Where gelatin is used as a binding agent for a photographic emulsion, dyeing must be carried out with a consideration of the isoelectric point of gelatin, since gelatin is an amphoteric electrolyte. At a pH higher than the isoelectric point of the gelatin used, the gelatin has negative charge and, at a lower pH, a positive charge.

In the case where there is formed a high molecular weight compound (hereinafter a high molecular compound) having a negative charge, therefore, dyeing is carried out with a basic dye at a pH lower than the isoelectric point of gelatin, whereby only the high molecular image can be dyed without gelatin being dyed therewith. Or, alternatively, the dyeing is initially carried out uniformly at a pH of higher than the isoelectric point, followed by washing with a washing solution having a pH lower than the isoelectric point of gelatin, whereby a high molecular image free area is washed out, and only the high molecular image area remains colored.

In the case where a high molecular image having a positive charge is dyed with an acid dye, similarly dyeing may be carried out at a pH higher than the isoelectric point of gelatin. If the pH is too high or too low, the solubility of a dye lowers or else the ionization of the high molecular compound to be charged is disturbed. Accordingly, the most suitable range for the pH is determined according to the variety of vinyl compound, dye and binder, such as gelatin, used. A preferred pH range is 2.5–4.5 where a gelatin having an isoelectric point of about 4.9, processed ordinarily with lime, is used and a high molecular compound having negative charge is dyed with a basic dye, and 5.0–8.0 where a high molecular compound having positive charge is dye with an acid dye. Dyes available are, as the acid dye, C.I. Acid Yellow 7 (C.I. 56205), C.I. Acid Yellow 23 (C.I. 19140), C.I. Acid Red 1 (C.I. 18050), C.I. Acid Red 52 (C.I. 45100), C.I. Blue 9 (C.I. 42090), C.I. Acid Blue 45, C.I. Acid Blue 62 (C.I. 62045) and C.I. Acid Violet 7 (C.I. 18055), and, as the basic dye, C.I. Basic Yellow 1 (C.I. 49005), C.I. Basic Yellow 2 (C.I. 41000), C.I. Basic Red 1 (C.I. 45160), C.I. Basic Red 2 (C.I. 50240), C.I. Basic Blue 25 (C.I. 52025), C.I. Basic Violet 3 (C.I. 42555) and C.I. Basic Violet 10 (C.I. 45170), etc. The number of these dyes is according to the Color Index (2nd Ed.) and they are sold under various brand names.

For the practice of this method, it is necessary to effect the reduction and polymerization reaction and then dyeing after irradiation with electromagnetic waves or particle rays.

When only non-polymerized vinyl monomer is washed out after irradiation, reduction and polymerization, an image from a highly polymerized compound is left. Since the polymer is generally less soluble than the monomer and scarcely diffuses in a gelatin layer where a high molecular compound has been added initially as a binder for a silver halide photographic emulsion, it is not dissolved in water and retained like gelatin, only a polymerized area is left to form an image. The use of a monomer having two or more vinyl groups may strengthen the insolubility and undiffusibility of the polymer.

The dyeing mentioned above (after polymerization) yields a dye image bonded with a high molecular image. This dye image can be utilized as a clear dye image by removing silver halide by fixing and reacting with an oxidizer and a solvent for silver salts to dissolve off the silver image. When a reducing agent having a very high polymerization initiating effect is employed, the polymerization reaction occurs sufficiently even when only a very slight amount of reduced silver is formed; hence, in such a case, it is scarcely, or not at all, necessary to remove the silver images by oxidation.

The formed dye image may be transferred to another support. Transferring can be carried out by wetting a layer possessing the formed dye image with a solvent for the dye such as methanol, water or an aqueous solution of acid, base or salt, and bringing the wetted layer into close contact with the support which it is to be transferred to. As a support to be transferred to, there can be used ordinary papers, papers onto which a hydrophilic polymer layer or gelatin layer has been coated, and films onto which a hydrophilic polymer or gelatin layer has been coated. In transferring to a support onto which a gelatin layer has been coated, one which has been mordant-treated, for instance with an aluminum salt, is preferably used as in ordinary dye transfer methods. Once a high molecular image capable of being charged is made, it can be reproduced a plurality of times by dyeing and transferring as mentioned above. One dyeing can give several transfer images, and one high molecular image can be subjected to repeated dyeing to readily give a number of copies.

The present invention will be further illustrated by the following non-limiting examples.

EXAMPLE 1

A gelatino-silver chlorobromide photographic emulsion containing silver chlorobromide corresponding to 42 g. of silver and having a molar ratio of 7:3, containing 60 g. of gelatin, having a pH of 5.8, pAg of 7.6, and a fine particle size, was divided into two portions. One portion was exposed to a fluorescent lamp. For exposure, 200 ml. of the emulsion liquid at about 35° C. was spread in a vat of 20 cm. x 25 cm. and allowed to stand under agitation for about 5 minutes under an illumination of about 300 lux. 2.5 ml. of the exposed emulsion and the non-exposed emulsion were, respectively, taken and placed into test tubes of 1.6 cm. in diameter, to which 6 ml. of water, 4.0 g. of acrylamide and $10^{-3}$ mol of acetylacetone were added. After adequately stirring and adjusting the temperature to 60° C., the test tubes were allowed to stand in a heat insulating material of foamed polystyrene of 2 cm. thickness, kept in a thermostat at 60° C., 3 ml. of 1 N sodium hydroxide was directly added to both test tubes and the change in temperature was recorded by a thermistor. In the system formed from the exposed emulsion, the acrylamide was polymerized and the temperature was raised by the heat of polymerization, the temperature of the system reaching 108° C. after about 20 minutes from the initiation of reaction. In the system from the non-exposed emulsion, the temperature reached only 78° C. in the same reaction time.

In the above, it is evident from the generation of heat that polymerization occurred. Although heat may be generated by the reduction of the silver halide in addition to the polymerization reaction, it is too little to be detected as a change of temperature by the instrument used in this example. When using hydroquinone in place of acetylacetone, for example, silver halide was reduced to be black silver, but no generation of heat was detected.

In the case of using the non-exposed emulsion, polymerization occurs with generation of heat if the reaction time is lengthened. This corresponds to the general phenomenon found in ordinary photographic emulsion, i.e. if the developing time is too long, silver halide at non-exposed areas is also reduced to give fog and the image will hardly be detectable. Accordingly, the utility of the photographic material of this invention is not spoiled by this phenomenon.

EXAMPLE 2

The same procedure as that of Example 1 was repeated at the same conditions except that an active methylene compound as shown in the first line of Table 1 was used in place of acetylacetone, and the quantity of sodium hydroxide was changed. The amount of the active methylene compound is shown in Table 1, second line, the temperature of the thermostat in the third line, the amount of 1 N sodium hydroxide in the fourth line, the time to reach maximum temperature in the system using the exposed emulsion in the fifth line, the temperature at that time in the sixth line and the temperature of the system using the non-exposed emulsion at the same time in the seventh line.

In any case, polymerization occurred preferentially with the exposed emulsion.

After being allowed to stand at 30° C. for five minutes, a light brown image appeared at the exposed area. The sample was washed with a 1.5% aqueous solution of acetic acid for 40 seconds and fixed with the following fixing solution.

| | G. |
|---|---|
| Sodium thiosulfate (anhydrous) | 150 |
| Potassium metabisulfite | 15 |
| Water to make 1000 ml. | |

The fixed and water-washed sample was immersed in a 0.1% aqueous solution of a red basic dye, Rhodamine 6 GCP (C.I. Basic Red 1), at room temperature for five minutes, and then washed with a 5% aqueous solution of acetic acid for five minutes. The dye on the area other than the foregoing brown image area was washed out, but the image area which remained was colored red. The brown image, a silver image, could readily be dissolved off with Farmer's reducing solution. Upon removing the silver image, a clear red image was obtained. By reversing the order of dyeing and removal of the silver image, i.e., by removing the silver image first to give an apparently colorless and transparent image and then dyeing as mentioned above, a clear red image could similarly be obtained.

TABLE 1

| Number | Reducing agent | Amount, mg. | Bath temp., °C. | Amount of 1N NaOH | Time, min. | Temp. of exposed emulsion | Temp. of non-exposed emulsion |
|---|---|---|---|---|---|---|---|
| 19 | Acetoacetanilide | 177 | 50 | 2 | 30 | 75 | 54 |
| 20 | Benzoylacetone | 162 | 60 | 3 | 58 | 99.5 | 86 |
| 21 | Methyl acetoacetate | 116 | 57 | 3 | 27 | 78 | 70 |
| 22 | Ethyl n-amylacetoacetate | 200 | 57 | 3 | 30 | 63.5 | 57 |
| 23 | Sodium acetoacetate | 124 | 58 | 3 | 54 | 69.5 | 62 |
| 24 | β-Acetoxycrotonate | 172 | 57 | 0.5 | 150 | 69 | 59 |
| 25 | Ethyl-2-chloroacetoacetate | 165 | 58 | 1.0 | 20 | 107 | 83 |
| 26 | Phenylhydrazone dehydroacetate | 258 | 55 | 1.0 | 38 | 80 | 71.5 |

EXAMPLE 3

A photographic film coated with a gelatino-silver chloroiodobromide photographic emulsion was exposed and then treated with a solution containing ethyl α-phenyl-cyanoacetate (No. 16) and sodium methacrylate to effect imagewise polymerization. The thus obtained polymer image was dyed with a basic dye. The photographic film was made by under-coating both surfaces of a support of polyethylene terephthalate, applying an antihalation layer to one surface, applying to the other surface a fine grain gelatino-silver halide emulsion containing 0.7 mol of chlorine, 0.3 mol of bromine and 0.001 mol of iodine per 1 mol of silver and 100 g. of gelatin, to which was added merocyanine sensitizing dye having a maximum sensitivity at 550 mμ, 1.5 g. of mucochloric acid per 100 g. of gelatin as a hardener, and suitable stabilizers and surface active agents. 50 mg. of silver were contained per 100 cm.² in the coating, and there was then applied thereto a protective layer of gelatin of about 0.8μ onto the emulsion layer. This photographic film is normally used for making line and half-tone images for photomechanical reproduction.

A line image negative was superposed on the photographic film, exposed to a light of about 100 lux for 2 seconds and immersed in a solution having the following composition under a red safety light.

| | |
|---|---|
| Sodium methacrylate | g.. 75 |
| Ethyl α-phenylcyanoacetate (No. 16) | g.. 8.5 |
| Water | ml.. 75 |
| 2 N-NaOH, to adjust pH to 11.6. | |

The dye image thus obtained could be transferred to a sheet of paper, for example, by wetting a writing paper with methanol by rubbing it with a sponge containing methanol, contacting the dye image closely with writing paper under pressure, and separating both after about 30 seconds.

When using a 0.1% aqueous solution of Crystal Violet (C.I. Basic Violet 3) for the dyeing, forming a dye image and transferring were similarly carried out to obtain a blue-violet transfer image.

When using a 0.1% aqueous solution of Auramine 0–100 (C.I. Basic Yellow 2) as a dye, a yellow image was obtained.

When using a 0.1% aqueous solution of Basic Blue G.O. (C.I. Basic Blue 25) as a dye, a blue image was obtained.

In transferring a dye image, it is not necessary to remove the silver image and the silver halide. Accordingly, a transferred image was also obtained by dyeing and transferring directly after developing, polymerizing, stopping and washing with water.

EXAMPLE 4

The same film as that of Example 3 was exposed as in Example 3 and processed with various solutions having the following formulas, and containing various reducing agents as shown in Table 2.

| | |
|---|---|
| Sodium methacrylate | 75 g. |
| Reducing agent | Shown in Table 2. |
| Water | 75 ml. |
| 2 N NaOH | To adjust pH to the value shown in Table 2. |

The sample was processed at 30° C. for a period of time as shown in Table 2, fixed and washed with water as in Example 3 and then dyed with 0.1% Rhodamine 6 GCP as in Example 3. The transmission densities for green light before and after dyeing were measured for exposed areas and non-exposed areas of each sample.

The kind of reducing agent, amount, pH value during processing, processing time, optical density before dyeing and optical density after dyeing are tabulated in Table 2.

TABLE 2

| Number | Reducing agent | Amount, g. | Processing time, min. | Density of non-exposed area | | Density of exposed area | | pH |
|---|---|---|---|---|---|---|---|---|
| | | | | Before dyeing | After dyeing | Before dyeing | After dyeing | |
| 1 | Acetylacetone | 5.00 | 70 | 0.07 | 0.27 | 0.11 | 0.70 | 11.60 |
| 2 | 1,3-cyclohexanedione | 5.04 | 30 | 0.08 | 0.44 | 0.11 | 2.20 | 11.50 |
| 3 | 6-acetyl-3-methyl-2-cyclohexene-1-one | 6.84 | 10 | 0.18 | 0.35 | 0.33 | 1.52 | 11.50 |
| 4 | 3-acetyl-2,6-heptadione | 7.60 | 70 | 0.09 | 0.20 | 0.10 | 0.35 | 11.50 |
| 5 | Ethyl acetoacetate | 5.85 | 70 | 0.08 | 0.29 | 0.08 | 0.76 | 12.40 |
| 6 | o-Methoxy-acetoacetanilide | 0.32 | 70 | 0.09 | 0.25 | 0.08 | 0.38 | 11.50 |
| 7 | Ethyl $\alpha$-methylacetoacetate | 6.48 | 70 | 0.08 | 0.18 | 0.08 | 0.40 | 11.50 |
| 8 | Ethyl $\alpha$-n-hexylacetoacetate | 9.63 | 70 | 0.08 | 0.19 | 0.08 | 0.25 | 11.50 |
| 9 | Ethyl $\alpha$-cyanoacetate | 6.97 | 70 | 0.07 | 0.17 | 0.06 | 0.22 | 11.50 |
| 10 | Ethyl $\beta$-acetoxycrotonate | 7.74 | 70 | 0.07 | 0.22 | 0.08 | 0.84 | 11.50 |
| 11 | Ethyl $\beta$-anilinocrotonate | 9.22 | 70 | 0.11 | 0.17 | 0.12 | 0.26 | 11.50 |
| 12 | Ethyl $\beta$-ethoxyacrylate | 5.40 | 70 | 0.09 | 0.17 | 0.09 | 0.22 | 11.60 |
| 13 | Ethyl $\beta$-iminobutyrate | 5.85 | 70 | 0.17 | 0.34 | 0.08 | 2.00 | 11.50 |
| 14 | Acetylacetaldehyde dimethyl acetal | 5.94 | 70 | 0.10 | 0.19 | 0.10 | 0.23 | 9.00 |
| 15 | Malononitrile | 2.97 | 30 | 0.08 | 0.23 | 0.09 | 2.42 | 9.00 |
| 16 | Ethyl $\alpha$-phenyl cyanoacetate | 8.50 | 5 | 0.09 | 0.26 | 0.29 | 1.51 | 11.60 |
| 17 | Ni-ethyl acetoacetate | 1.17 | 60 | 0.08 | 0.28 | 0.09 | 1.48 | 11.50 |
| 18 | Ethyl $\alpha$-butylacetoacetate | 8.37 | 64 | 0.07 | 0.17 | 0.08 | 0.95 | 11.60 |

In all cases, the density due to dyeing increased more at an exposed area than on an non-exposed area. This shows that the exposed area was selectively dyed. This is also supported by the fact that the silver image of each sample was removed by Farmer's reducer to leave a clear red image. In a sample with a low silver image density, a clear red image was found even without removing the silver image. These dye images could be transferred to writing paper using methanol similar to Example 3.

EXAMPLE 5

This experiment is similar to Example 4, was carried out using a metal salt in combination with the active methylene compound. As a reducing agent, phenylhydrazone dehydroacetate was used with a metal salt to determine the effect thereof. The sample was immersed in the following processing solution.

Potassium metabisulfite _____ 3 g.
Sodium methacrylate _____ 75 g.
Phenylhydrazone dehydroacetate __ 12 g.
Metal salt _____ 4.5×10⁻⁴ mol.
Water _____ 75 ml.
2 N NaOH _____ To adjust the pH as shown in Table 3.

The sample was processed at a temperature for a period of time as shown in Table 3, and the results are tabulated in Table 3 as in Example 4.

TABLE 3

| Metal salt | pH | Temp., ° C. | Time, min. | Density of non-exposed area | | Density of exposed area | |
|---|---|---|---|---|---|---|---|
| | | | | Before dyeing | After dyeing | Before dyeing | After dyeing |
| None | 9.10 | 40 | 30 | 0.08 | 0.20 | 0.09 | 1.30 |
| Nickel chloride | 9.40 | 40 | 30 | 0.16 | 0.27 | 0.57 | 3.47 |
| Barium chloride | 9.30 | 40 | 30 | 0.07 | 0.34 | 0.18 | 2.07 |
| Copper acetate | 9.20 | 40 | 30 | 0.22 | 1.98 | 0.97 | over 4 |

As is evident from Table 3, the image density due to dyeing was raised by the use of a metal salt. This is possibly due to the fact that the reducing agent and metal salt are partly chelated to change the reactivity of the active methylene compound, or else that the metal salt catalyzes the redox reaction of the silver halide with the reducing agent. The correct mechanism thereof is not completely clear.

EXAMPLE 6

The film of Example 3 was exposed as in Example 3, processed with a solution of the following recipe, developed and polymerized. Using a basic monomer, a polymer capable of being dyed with an acid dye was given.

1 - vinyl-2,3,-dimethylimidazolium-
  p-toluenesulfonate _____ 75 g.
Ethyl $\alpha$ - phenylcyanoacetate (No. 16) _____ 0.85 g.
Potassium metabisulfite _____ Required for adjusting pH to 9 or 11.5.
Water _____ 85 ml.

1-vinyl - 2,3 - dimethyimidazolium - p - toluenesulfonate having a melting point of 142.5° C. was obtained by reacting 1-vinyl-2-methylimidazole with methyl p-toluenesulfonate at room temperature and recrystallizing the product from ethanol and ether.

The sample was processed at 30° C. for 30 minutes to thus obtain a light brown silver image together with an image of a polymer of a quaternary salt. That is to say, the sample was fixed and washed with water as in Example 3, dyed with 0.1% aqueous solution of blue acid dye, Suminol Leveling Sky Blue R extra conc. (C.I. Acid Blue 62) and washed with a 1% sodium hydrogen carbonate solution for five minutes to give a blue image. It was confirmed that, in the case of a higher pH of the system, the sharpness of an image by dyeing was larger and the polymerization reaction proceeded to a greater degree. When the sample was subjected to desilvering as in Example 3, a sharp blue image was obtained. The image could be transferred to a writing paper wetted with methanol as in Example 3. When a dye transfer paper (prepared by coating a baryta paper with a gelatin layer of about 10 microns thickness, then immersing it in an aqueous solution of alum and drying) was wetted with water, brought into close contact with the foregoing dye image, allowed to stand for one minute and then separated, a high density sharp blue image was obtained. The sample was immersed in 0.1% aqueous solution of red acid dye, Solar Rhodamine B extra (C.I. Acid Red 52) which was used in place of Suminol Leveling Sky Blue R extra conc. Immersion was for five minutes for overall dyeing, and it was then immersed in Koltoff's buffer solution at pH 5.0 for three minutes and washed with water, thus obtaining a sample where the image area was only dyed red.

The image could be transferred to a writing paper moistened with methanol and to a transfer paper moistened with water as mentioned above.

The sample was dyed with Solar Pure Yellow 8 G (C.I. Acid Yellow 7) and washed with a buffer solution of pH 5.0 to give a yellow image which could be transferred to a writing paper wetted with methanol, or a transfer paper wetted with water, by pressing.

In this invention, the number of carbon atoms in an alkyl or substituted alkyl group is preferably less than 17. Acceptable substituents for the substituted alkyl groups are carbonyl, ester, halide, carboxylic acid, etc.

Rings which $R_1$ can form with $R_2$ or $R_3$ include 6 membered rings of saturated or unsaturated carbons or 5-6 membered heterocyclic rings including nitrogen or oxygen. Representative substituents for substituted aromatic rings include mtoxy, halide, nitro, acyl, carboxyl, sulfone and hydroxyl groups.

Finally, by the term "high molecular weight material" is meant a material with a molecular weight greater than 1,500, with 10,000 being a more preferred figure.

We claim:

1. A method for forming a polymer image from a reaction system consisting essentially of a silver halide emulsion, an active methyl compound, and at least one addition-polymerizable vinyl monomer or vinylidene monomer which comprises developing a silver halide photographic emulsion having a latent image with at least one active methylene compound represented by the following General Formulas (a), (b) or (c), tautomeric isomers thereof and metal complex salts thereof, in the presence of at least one addition-polymerizable member selected from the group consisting of vinyl monomers and vinylidene monomers to polymerize said monomer selectively at the latent image areas, said silver halide acting as an oxidizer, said polymerization being initiated by the oxidizing intermediate product formed from the reactivity between said active methylene compound and said silver halide:

General Formula (a)

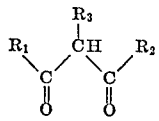

wherein $R_1$ and $R_2$ are members selected from the group consisting of an alkyl group, a substituted alkyl group, and a substituted phenyl group, $R_3$ is a member selected from the group consisting of a hydrogen atom, an alkyl group and a substituted alkyl group, said $R_1$ being capable of forming a ring with $R_2$ or $R_3$:

General Formula (b)

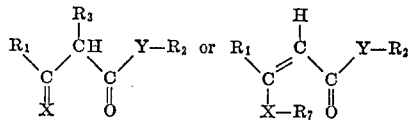

wherein $R_1$ is a member selected from the group consisting of a hydrogen atom and an alkyl group, $R_2$ is a member selected from the group consisting of an alkyl group, a substituted aromatic ring, and sodium, $R_3$ is a member selected from the group consisting of a hydrogen atom, an alkyl group, a substituted alkyl group, a cyano group and a chlorine atom, $R_2$ and $R_3$ capable of forming a ring, $R_7$ being an aromatic ring when X is —NH— and a member selected from the group consisting of an acyl group and an alkyl group when X is —O—, X is a member selected from the group consisting of O, NH, and

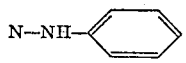

and Y is a member selected from the group consisting of O and NH; and

General Formula (c)

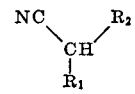

wherein $R_1$ is a member selected from the group consisting of a hydrogen atom, an acyl group and a phenyl group, and $R_2$ is a member selected from the group consisting of an ethoxy carbonyl group and a cyano group.

2. The method of claim 1, wherein said alkyl group and said substituted alkyl group contain less than 17 carbon atoms.

3. The method of claim 1, wherein said substituted alkyl group is substituted with substituents selected from the group consisting of carbonyl, ester, halide and carboxylic acid.

4. The method of claim 1, wherein said ring formed between $R_1$ and $R_2$ or $R_3$ is a ring selected from the group consisting of a six-membered ring of saturated or unsaturated carbon atoms and a five to six-membered heterocyclic ring having within its molecular nucleus a member selected from the group consisting of nitrogen and oxygen.

5. The method of claim 1, wherein said substituted aromatic ring is substituted with a substituent selected from the group consisting of methoxy, halide, nitro, acyl, carboxyl, sulphone, and hydroxyl.

6. The method of claim 1, wherein said polymerization is carried out in the presence of a sulfite ion.

7. The method of claim 6, wherein the precursor for said sulfite ion is a members selected from the group consisting of an alkali metal sulfite, an alkali metal bisulfite, an ammonium sulfite, an ammonium bisulfite, an alkali metal pyrosulfite, an ammonium pyrosulfite, and an aldehyde bisulfite adduct.

8. The method of claim 6, wherein said sulfite ion is present in an amount greater than 0.05 mol per liter.

9. The method of claim 6, wherein said sulfite ion is present in an amount greater than 0.2 mol per liter.

10. The method of claim 1, wherein an image of the formed polymer is selectively dyed with a dye having a charge opposite that of the high molecular weight compound when ionized.

11. The method of claim 10, wherein said high molecular weight compound is one to be formed with a negative charge and is a member selected from the group consisting of vinyl compounds having a carboxyl group, vinyl compounds having a metal or ammonium carboxylate group, vinyl compounds having a sulphonate group, and vinyl compounds having a metal or ammonium sulphonate group.

12. The method of claim 10, wherein said high molecular weight compound is formed with a positive charge and is a member selected from the group consisting of vinyl compounds having a basic nitrogen atom, and vinyl compounds having a quaternary nitrogen atom.

13. The method of claim 10, wherein said dye is a member selected from the group consisting of an acid dye and a basic dye.

14. The method of claim 10, wherein said silver halide photographic emulsion is a gelatin emulsion.

15. The method of claim 14, wherein a basic dye is utilized and the pH of said system is maintained lower that the iso-electric point of said gelatin.

16. The method of claim 15, wherein said pH ranges from 2.5 to 4.5.

17. The method of claim 15, wherein said pH ranges from 5.0 to 8.0.

18. The method of claim 14 wherein said dye is an acid dye and the pH of said gelatin is maintained higher than the iso-electric point of said gelatin.

19. The method of claim 1 wherein said vinyl and vinylidene monomer have at least two vinyl groups in their molecular structure.

20. The method of claim 19, wherein said monomer having at least two vinyl groups is a member selected from the group consisting of N,N-methylenebisacrylamide, ethylene glycol dimethacrylate, diethylene glycol dimethacrylate, triethylene glycol dimethacrylate, polyethylene glycol dimethacrylate, divinyl ether, and divinyl benzene.

21. The method of claim 1, wherein said addition-polymerizable monomer is a vinyl monomer which is water-soluble.

22. The method of claim 1, wherein said vinyl monomer is a member selected from the group consisting of acrylamide, acrylonitrile, N-hydroxy-methacrylamide, methacrylic acid, acrylic acid, calcium acrylate, sodium acrylate, methylmethacrylate, methylacrylate, ethylacrylate, vinylpyrrolidone, 2-vinylpyridine, 4-vinylpyridine, 2-methyl - N - vinylimidazole, potassium vinylbenzene sulphonate, and vinyl carbazole.

23. The method of claim 1, wherein said reaction is carried out in an aqueous system.

24. The method of claim 1, wherein said addition-polymerizable compound is present in an amount of from 1/30 to 30 times by weight the amount of high molecular weight compound.

25. The method of claim 24, wherein said amount ranges from ¼ to 4 times as much as that of the high molecular weight compound.

26. The method of claim 1, wherein, said silver halide is present in an amount of from 1/20 to 2 times by weight the amount of the high molecular weight compound.

27. The method of claim 26, wherein said amount ranges from 1/10 to ½ times the amount of said high molecular weight compound.

28. The method of claim 1, wherein said active methylene compound is present in an amount of from 1/20 to 5 mols per mol of silver halide.

29. The method of claim 28, wherein said amount ranges from 1/10 to 1 mol per mol of silver halide.

30. The method of claim 17, further comprising the addition of a thermal polymerization inhibitor in an amount of from 1/100,000 to 2/100 times by weight, as much as that of said vinyl compound.

31. The method of claim 30, wherein said inhibitor is a member selected from the group consisting of p-methoxy phenol, hydroquinone, alkyl hydroquinone and 2,6-di-t-butyl-p-cresol.

32. The method of claim 1, wherein said method is carried out at a pH greater than 6.

33. The method of claim 1, wherein said method is carried out at a pH greater than 7.

34. The method of claim 1, wherein said methylene compound is a member selected from the group consisting of acetylacetone, 1,3-cyclohexanedione, 6-acetyl-3-methyl-2-cyclohexene-1-one, 3-acetyl-2,6-heptanedione, ethyl acetoacetate, o-methyl-acetoacetanilide, ethyl α-methylacetoacetate, ethyl α-n-hexyl-acetoacetate, ethyl α-cyanoacetoacetate, ethyl β-acetoxycrotonate, ethyl 3-anilinocrotane, ethyl β-ethoxyacrylate, ethyl β-iminobutyrate, acetoacetaldehyde dimethyl acetal, malononitrile, ethyl α-phenyl-cyanoacetate, ethyl nickel acetoacetate, ethyl α-n-butyl - acetoacetate, acetoacetanilide, benzoyl acetone, methyl acetoacetate, ethyl α-n-amyl-acetoacetate, sodium acetoacetate, 2-acetylbutyrolactone, ethyl α-chloroacetoacetate and phenylhydrazone dehydroacetate.

35. The method of claim 1, wherein said methylene compound and said vinyl compound are contained in the silver halide photographic emulsion.

36. The method of claim 1, wherein only one of said methylene compound or vinyl compound is contained in the silver halide photographic emulsion.

37. A method for forming a polymer image from a reaction system consisting essentially of a silver halide emulsion, an active methyl compound, and at least one addition-polymerizable vinyl monomer or vinylidene monomer which comprises developing a silver halide photographic emulsion having a latent image with at least one active methylene compound represented by the following General Formulas (a), (b) or (c), tautomeric isomers thereof and metal complex salts thereof, in the presence of at least one addition-polymerizable member selected from the group consisting of vinyl monomers and vinylidene monomers to polymerize said monomer selectively at the latent image areas, said silver halide acting as an oxidizer, said polymerization being initiated by the oxidizing intermediate product formed from the reactivity between said active methylene compound and said silver halide:

General Formula (a)

$$\begin{array}{c} R_3 \\ | \\ R_1 \diagdown \; CH \; \diagup R_2 \\ C \quad\quad C \\ \| \quad\quad \| \\ O \quad\quad O \end{array}$$

wherein $R_1$ and $R_2$ are members selected from the group consisting of an alkyl group, a substituted alkyl group, and a substituted phenyl group, $R_3$ is a member selected from the group consisting of a hydrogen atom, an alkyl group and a substituted alkyl group, said $R_1$ being capable of forming a ring with $R_2$ or $R_3$;

General Formula (b)

$$R_1 \diagdown \underset{\underset{X}{\overset{\|}{C}}}{CH(R_3)} \diagup \underset{\underset{O}{\overset{\|}{C}}}{Y-R_2} \quad \text{or} \quad R_1 \diagdown \underset{\underset{X}{\overset{\|}{C}}}{C(H)} \diagup \underset{\underset{O}{\overset{\|}{C}}}{Y-R_2} \diagdown R_7$$

wherein $R_1$ is a member selected from the group consisting of a hydrogen atom and an alkyl group, $R_2$ is a member selected from the group consisting of an alkyl group, a substituted aromatic ring, and sodium, $R_3$ is a member selected from the group consisting of a hydrogen atom, an alkyl group, a substituted alkyl group, a cyano group and a chlorine atom, $R_2$ and $R_3$ capable of forming a ring, $R_7$ being an aromatic ring when X is —NH— and a member selected from the group consisting of an acyl group and an alkyl group when X is —O—, X is a member selected from the group consisting of O, NH, and $$N-NH-\!\!\!-\!\!\!\!\bigcirc$$

and Y is a member selected from the group consisting of O and NH; and

General Formula (c)

$$\begin{array}{c} NC \diagdown \;\; \diagup R_2 \\ CH \\ | \\ R_1 \end{array}$$

wherein $R_1$ is a member selected from the group consisting of a hydrogen atom, an acyl group and a phenyl group, and $R_2$ is a member selected from the group consisting of an ethoxy carbonyl group and a cyano group, said alkyl and substituted alkyl group containing less than 17 carbon atoms, said substituent for said substituted alkyl group being selected from the group consisting of carbonyl, ester, halide, and carboxylic acid, said ring which $R_1$ can form with $R_2$ or $R_3$ being selected from the group consisting of a six-membered ring of saturated or unsaturated hydrocarbons and a five to six-membered heterocyclic ring containing therein an oxygen or nitrogen atom, said substituted aromatic ring being substituted with a member selected from the group consisting of methoxy, halide, nitro, acyl, carboxyl, sulphone and hydroxyl, and said methylene compound being present in an amount of from 1/20 to 5 mols.

(References on following page)

References Cited

UNITED STATES PATENTS

| | | | |
|---|---|---|---|
| 3,019,104 | 1/1962 | Oster | 96—29 |
| 3,038,800 | 6/1962 | Luckey et al. | 96—35.1 |
| 3,070,442 | 12/1962 | Cohen et al. | 96—115 |
| 3,488,269 | 1/1970 | Allen et al. | 204—159.23 |

RONALD H. SMITH, Primary Examiner

U.S. Cl. X.R.

96—28, 35.1, 115 P